June 24, 1930.                W. E. WINE                1,768,183
                          BRAKE MECHANISM
                        Filed July 7, 1927           2 Sheets-Sheet 1
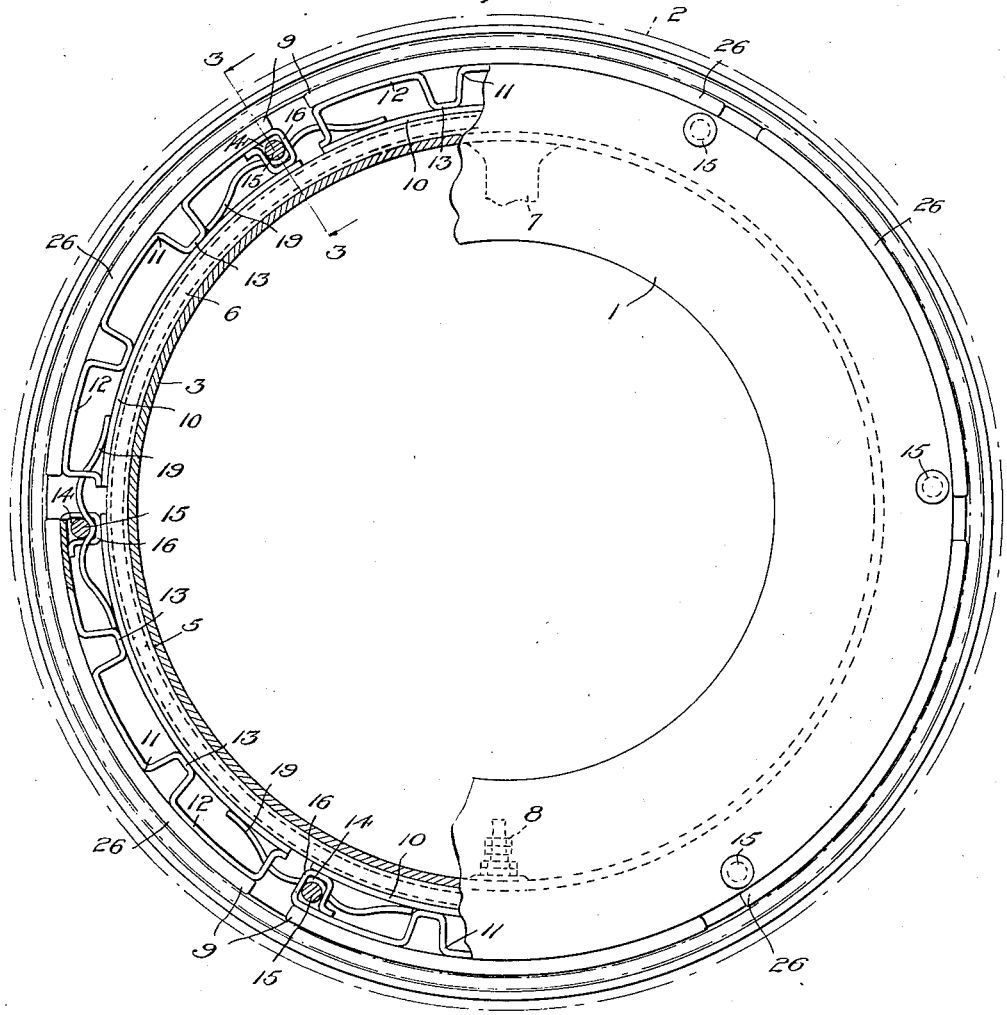
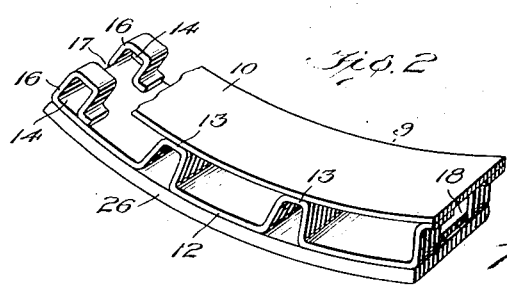
Inventor
William E. Wine
By
his Attorneys

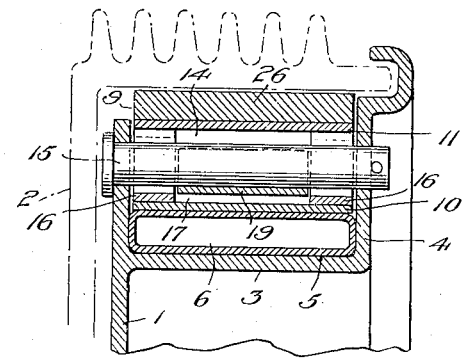
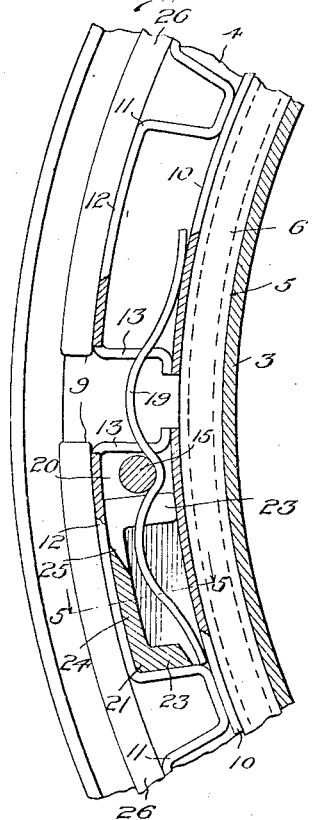
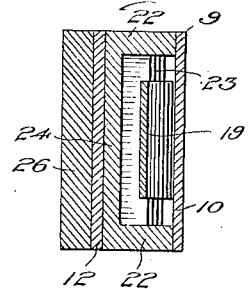
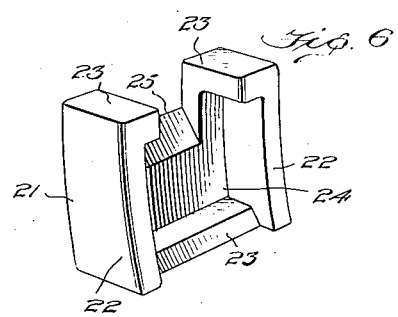

Patented June 24, 1930

1,768,183

UNITED STATES PATENT OFFICE

WILLIAM E. WINE, OF TOLEDO, OHIO

BRAKE MECHANISM

Application filed July 7, 1927. Serial No. 203,995.

My invention relates to brake mechanisms and particularly to that class of brakes designed for use in connection with automobiles wherein the braking element comprises a plurality of separate shoes.

The principal object of my invention is to support the brake shoe segments in a manner such that when they are operated to arrest forward movement of the vehicle they are at all times maintained in tension thereby eliminating chattering or squeaking.

A primary feature of my invention consists in providing in combination with a brake mechanism a plurality of circumferentially arranged shoes all portions of which are radially movable into engagement with a rotating part of a vehicle for arresting movement of the latter.

Another feature of the invention consists in providing in combination with a brake mechanism, a circular housing having a plurality of arcuate shoes circumferentially arranged therein, said shoes being slidably connected to the housing so as to be movable radially thereof into engagement with a rotating part of a vehicle for arresting movement of the latter.

Other and more specific features of construction and advantageous arrangement of detailed parts will hereinafter appear and be pointed out in the claims.

In the drawings illustrating preferred embodiments of the invention

Figure 1 is a view partly in elevation and partly in section of a portion of a brake mechanism showing my invention as applied thereto.

Figure 2 is a perspective view of one of the brake shoes.

Figure 3 is a detail sectional view taken on the line 3—3, Fig. 1.

Figure 4 is a detail view partly in section and partly in elevation illustrating a modified form of the invention.

Figure 5 is a sectional view taken on the line 5—5, Fig. 4.

Figure 6 is a perspective view of one of the filler castings.

While for the purposes of disclosing the invention a hydraulic braking system has been illustrated it will be appreciated that the invention is not limited in its application to a brake mechanism of that type.

In the drawings 1 indicates a plate-like member which is adapted to be immovably secured to a portion of a vehicle adjacent a rotating part thereof, such as the drum 2 shown in Figure 3 in dotted lines. Near its outer edge the member 1 is provided with a laterally extending flange 3, preferably integral therewith, which terminates in an upwardly projecting flange 4, these flanges together with the outer edge of the member 1 forming an annular groove or housing 5.

Within the housing and in contact with the base flange 3 thereof is an expansible fluid chamber 6 containing fluid adapted to receive pressure from a reservoir (not shown) through the hose 7. The chamber 6 is preferably provided with a valve 8 of usual design adapted to be connected to a fluid supply for replenishing the fluid in the braking system. A plurality of arcuate brake shoes 9 are circumferentially arranged within the housing or groove 5 in engagement with the outer side of the fluid chamber 6. Each of the shoes is fashioned from two plates, 10 and 11, respectively, the base or inner plate 10 being uniformly arced from end to end thereby presenting a smooth surface for contact with the fluid chamber. The outer plate 11 has arcuate portions 12 spaced from the inner plate 10 and concentric therewith. These arcuate portions are maintained in spaced relation to the inner plate 10 by intervening spacing portions or projections 13 whose inner ends contact with and are preferably welded to the base plate of the shoe. Secured to the outside of the arcuate portions 12 of the outer plate in any suitable manner (not shown) is the usual brake lining 26.

For detachably securing the shoes in the housing or groove each of them is provided at one end with a restricted opening or space 14 for receiving a pin 15 which extends through the vertical walls of the housing. This pin receiving space 14 in each of the shoes may advantageously be formed by bending outwardly toward the outer plate the end spacing projection 16 of the latter. It will be seen that while means is thus provided for effectively preventing circumferential movement of the shoes in the housing, the pins, while tending to limit, do not prevent radial movement thereof.

In each of the shoes the walls defining the pin receiving opening 14 is cut away intermediate its ends, as at 17, and the spacing projection at the opposite end of each is cut away or apertured as at 18 for receiving a spring 19. This spring by contacting with the inner plates of adjacent shoes and by extending beneath the associated pin efficiently holds the shoes in contact with the expansible chamber 6.

In the modified form of the invention illustrated in Figures 4, 5 and 6 the pin receiving opening 20 is formed by employing a removable filler casting 21 which fits within either of the end spaces of the shoe defined by the inner and outer plates thereof and the spacing projections 13 of the latter. The casting 21 which is formed with side walls 22, end walls 23 and an outer wall 24 contacting with the inner side of the arcuate portion 12 of the plate 11 terminates sufficiently far from the end spacing projection 16 to permit the insertion of the pin 15 between it and the said projection. One of the end walls 23 and a portion of the outer wall 24 are cut away as at 25 to receive the spring 19, the latter serving not only to hold adjacent shoes in contact with the expansible chamber 6, as heretofore described, but also serving to maintain the filler casting in proper position in the shoe.

It will be appreciated that when pressure is applied to the fluid in the chamber the arcuate brake shoes are caused to move radially outward against the action of the springs 19 into engagement with the brake drum 2 thereby arresting movement of the latter. As the brake shoes are secured in the housing so as to extend from their respective points of attachment in the direction of rotation of the brake drum it will be seen that when the brakes are applied during the forward movement of the vehicle the brake shoes are placed in tension, pulling against their respective pins.

I claim:

1. A brake mechanism for a vehicle comprising a member having an annular groove, a plurality of shoes circumferentially arranged within said groove, means cooperable with each shoe for moving all portions thereof radially of said member into engagement with a rotating part of the vehicle for arresting movement of the latter, and means cooperable with the shoes for preventing substantial movement thereof circumferentially of the groove, said shoes being radially slidable with respect to said last named means and the latter being arranged so as to maintain said shoes in tension when they are operated to arrest forward movement of the car.

2. A brake mechanism for a vehicle comprising a member having an annular groove, a plurality of shoes circumferentially arranged within said groove, means for moving all portions of said shoes radially of said member into engagement with a rotating part of said vehicle for arresting movement of the latter, and means for slidably supporting said shoes within said groove, said last named means being arranged to maintain the shoes in tension during operation of the latter for arresting forward movement of said vehicle.

3. A brake mechanism for a vehicle comprising a circular housing, a plurality of arcuate shoes circumferentially arranged in said housing, and means for moving said shoes radially of said housing into engagement with a rotating part of a vehicle for arresting movement of the latter, each of said shoes comprising a plurality of curved plates having portions radially spaced from each other, and a plurality of pins for respectively slidably securing said shoes in the housing, each of said pins being disposed intermediate the spaced portions of its associated shoe and being arranged so as to maintain the shoe in tension during operation of the latter for arresting forward movement of said vehicle.

4. A brake mechanism for a vehicle comprising a circular housing, a plurality of arcuate shoes circumferentially arranged in said housing, and means for moving said shoes radially of said housing into engagement with a rotating part of a vehicle for arresting movement of the latter, each of said shoes comprising a plurality of curved plates having portions radially spaced from each other, a plurality of pins respectively disposed adjacent an end of the shoes for slidably securing them in the housing, and a plurality of filler castings respectively disposed intermediate the spaced portions of said shoes for cooperating with the associated pins to prevent the shoes from moving in one direction with respect to the pin, said pins being arranged so as to maintain the shoes in tension during operation of the latter for arresting forward movement of said vehicle.

5. A brake mechanism for a vehicle comprising a circular housing, a plurality of arcuate shoes circumferentially arranged in said housing, means for moving said shoes radially of said housing into engagement with a rotating part of the vehicle for arresting movement of the latter, each of said shoes comprising a plurality of curved plates having portions radially spaced from each other, a pin for each of said shoes for detachably securing it in the housing, said pins being interposed between the spaced portions of the plates of their associated shoes adjacent one end thereof so as to maintain the shoes in tension during operation of the latter for arresting forward movement of the vehicle, and spring means cooperable with each of said pins and the adjacent ends of neighboring shoes for normally maintaining said shoes in inoperative position.

6. A brake mechanism for a vehicle comprising a circular housing, a plurality of arcuate shoes circumferentially arranged in said housing, and means for moving all portions of said shoes radially into engagement with the rotating part of the vehicle for arresting movement of the latter, each of said shoes involving a plurality of curved plates having portions radially spaced from each other, and a plurality of pins respectively interposed between the spaced portion of said shoes for slidably securing said shoes in the housing, each of said shoes being provided with means for cooperating with the pins for preventing circumferential movement of said shoes, the pins being arranged so as to maintain the shoes in tension during operation of the latter for arresting forward movement of said vehicle.

7. A brake mechanism for a vehicle comprising a circular housing, a plurality of arcuate shoes circumferentially arranged in said housing, means for moving said shoes radially of said housing into engagement with a rotating part of the vehicle for arresting movement of the latter, each of said shoes comprising a plurality of curved plates having portions radially spaced from each other, a plurality of pins for respectively slidably securing said shoes in the housing, and filler castings cooperable with each of said pins for preventing circumferential movement of said shoes, said pins and filler castings being interposed between the spaced portions of the plates of their associated shoes and the pins being arranged so as to maintain the shoes in tension during operation of the latter for arresting forward movement of said vehicle.

In testimony whereof I affix my signature

WILLIAM E. WINE.